(12) United States Patent
Kim et al.

(10) Patent No.: US 11,136,457 B2
(45) Date of Patent: Oct. 5, 2021

(54) THERMOPLASTIC RESIN COMPOSITION AND ARTICLE PRODUCED THEREFROM

(71) Applicant: Lotte Advanced Materials Co., Ltd., Yeosu-si (KR)

(72) Inventors: Young Mi Kim, Uiwang-si (KR); Nam Hyun Kim, Uiwang-si (KR); Bong Jae Lee, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 104 days.

(21) Appl. No.: 16/722,187

(22) Filed: Dec. 20, 2019

(65) Prior Publication Data

US 2020/0207979 A1 Jul. 2, 2020

(30) Foreign Application Priority Data

Dec. 27, 2018 (KR) .................. 10-2018-0171342

(51) Int. Cl.
*C08L 69/00* (2006.01)
*C08K 5/526* (2006.01)

(52) U.S. Cl.
CPC ........... *C08L 69/00* (2013.01); *C08L 2205/03* (2013.01)

(58) Field of Classification Search
None
See application file for complete search history.

(56) References Cited

U.S. PATENT DOCUMENTS 3,755,610 A 8/1973 McTigue
8,304,494 B2 11/2012 Park et al.
2003/0149144 A1 8/2003 Lu et al.
2013/0079443 A1* 3/2013 Taschner ................. C08L 69/00
524/127
2018/0112035 A1 4/2018 Rizo et al.
2018/0163046 A1 6/2018 Tian et al.

FOREIGN PATENT DOCUMENTS

| EP | 3305848 A2 | 4/2018 |
| JP | 2002-179900 A | 6/2002 |
| JP | 2008-038003 A | 2/2008 |
| KR | 10-2004-0071712 A | 8/2004 |
| KR | 10-2010-0076643 A | 7/2010 |
| WO | 03/050189 A1 | 6/2003 |
| WO | 2016/189494 A1 | 12/2016 |

OTHER PUBLICATIONS

Extended Search Report in counterpart European Application No. 19218650.0 dated Jun. 3, 2020, pp. 1-6.

* cited by examiner

*Primary Examiner* — David J Buttner

(74) *Attorney, Agent, or Firm* — Additon, Pendleton & Witherspoon, P.A.

(57) ABSTRACT

A thermoplastic resin composition and a molded article formed of the same includes: about 100 parts by weight of a polycarbonate resin; about 1 to about 20 parts by weight of a rubber modified aromatic vinyl copolymer resin; about 0.1 to about 2 parts by weight of a maleic anhydride modified olefin copolymer; and about 0.1 to about 2 parts by weight of a phosphite compound represented by Formula 1 as described in the present specification. The thermoplastic resin composition can have good properties in terms of chemical resistance, impact resistance, and balance therebetween.

11 Claims, No Drawings

THERMOPLASTIC RESIN COMPOSITION AND ARTICLE PRODUCED THEREFROM

CROSS-REFERENCE TO RELATED APPLICATION

This application claims priority, under 35 USC Section 119, to and the benefit of Korean Patent Application No. 10-2018-0171342, filed on Dec. 27, 2018, the entire disclosure of which is incorporated herein by reference.

FIELD

The present invention relates to a thermoplastic resin composition and a molded article formed of the same.

BACKGROUND

Polycarbonate resins have good properties in terms of impact resistance, rigidity, transparency, thermal stability, self-extinguishability and dimensional stability, and are used as materials for electric/electronic products, automobile parts, lenses and glass substitute materials. However, typical polycarbonate resins exhibit poorer scratch resistance than glass.

Accordingly, the polycarbonate resin is subjected to clear-coating to prevent generation of scratches in actual use and to realize various colors, or is subjected to painting after injection molding to secure good appearance characteristics. In this process, a coating solution or paint is diluted with various organic solvents and then is applied to a surface of a resin product, followed by drying. However, the organic solvents used as diluents can penetrate the polycarbonate resin, causing deterioration in mechanical properties such as impact resistance and the like.

Therefore, there is a need for a thermoplastic resin composition which has good properties in terms of chemical resistance, impact resistance, and balance therebetween.

SUMMARY OF THE INVENTION

The present disclosure provides a thermoplastic resin composition which can have good properties in terms of chemical resistance, impact resistance, and balance therebetween, and a molded article formed of the same.

The thermoplastic resin composition includes: about 100 parts by weight of a polycarbonate resin; about 1 to about 20 parts by weight of a rubber modified aromatic vinyl copolymer resin; about 0.1 to about 2 parts by weight of a maleic anhydride modified olefin copolymer; and about 0.1 to about 2 parts by weight of a phosphite compound represented by the following Formula 1:

[Formula 1]

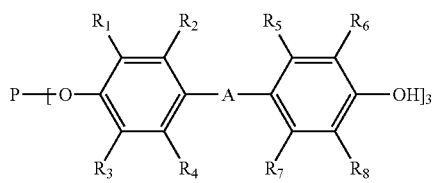

where $R_1$, $R_2$, $R_3$, $R_4$, $R_5$, $R_6$, $R_7$ and $R_8$ are each independently a hydrogen atom or a $C_1$ to $C_{10}$ alkyl group, and A is a sulfur atom or an oxygen atom.

The rubber modified aromatic vinyl copolymer resin may include a rubber modified aromatic vinyl graft copolymer and an aromatic vinyl copolymer resin.

The rubber modified aromatic vinyl graft copolymer may be obtained by graft copolymerization of a monomer mixture comprising an aromatic vinyl monomer and a vinyl cyanide monomer to a rubber polymer.

The maleic anhydride modified olefin copolymer may include a maleic anhydride modified alkylene-α-olefin copolymer obtained by graft copolymerization of maleic anhydride to an alkylene-α-olefin copolymer.

The maleic anhydride modified olefin copolymer may include a maleic anhydride modified ethylene-butene copolymer and/or a maleic anhydride modified ethylene-octene copolymer.

One or more of $R_1$, $R_2$, $R_3$ and $R_4$ may include a $C_4$ to $C_{10}$ branched alkyl group and one or more of $R_5$, $R_6$, $R_7$ and $R_8$ may include a $C_4$ to $C_{10}$ branched alkyl group.

The phosphite compound may include a compound represented by the following Formula 1a:

[Formula 1a]

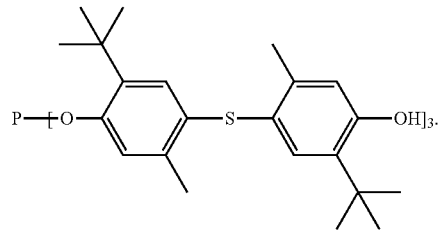

The maleic anhydride modified olefin copolymer and the phosphite compound may be present in a weight ratio of about 1:0.1 to about 1:3.

The thermoplastic resin composition may have a fracture height of about 55 cm to 100 cm, as measured on a 2 mm thick specimen using a drop impact tester in accordance with the DuPont drop test by dipping the specimen in a thinner solution for 2.5 minutes, drying the specimen at 80° C. for 20 minutes, allowing the specimen to be left at room temperature for 24 hours, and measuring a height, at which dropping a 4 kg dart results in breakage of the specimen.

The thermoplastic resin composition may have a notched Izod impact strength of about 70 kgf·cm/cm to about 100 kgf·cm/cm, as measured on a ⅛" thick specimen in accordance with ASTM D256.

The present disclosure also relates to a molded article. The molded article is formed of the thermoplastic resin composition described herein.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A thermoplastic resin composition according to the present disclosure includes (A) a polycarbonate resin; (B) a rubber modified aromatic vinyl copolymer resin; (C) a maleic anhydride modified olefin copolymer; and (D) a phosphite compound.

As used herein to represent a specific numerical range, the expression "a to b" means "≥a and ≤b".

(A) Polycarbonate Resin

The polycarbonate resin according to embodiments of the present disclosure may be a polycarbonate resin used in typical thermoplastic resin compositions. For example, the polycarbonate resin may be an aromatic polycarbonate resin obtained by reacting a precursor, such as phosgene, halogen formate, and/or carbonic diester, with diphenol(s) (aromatic diol compounds).

Examples of the diphenols may include 4,4'-biphenol, 2,2-bis(4-hydroxyphenyl)propane, 2,4-bis(4-hydroxyphenyl)-2-methylbutene, 1,1-bis(4-hydroxyphenyl)cyclohexane, 2,2-bis(3-chloro-4-hydroxyphenyl)propane, and/or 2,2-bis(3,5-dichloro-4-hydroxyphenyl)propane, and the like, and mixtures and/or combinations thereof, without being limited thereto. For example, the diphenols may include 2,2-bis(4-hydroxyphenyl)propane, 2,2-bis(3,5-dichloro-4-hydroxyphenyl)propane, and/or 1,1-bis(4-hydroxyphenyl)cyclohexane, for example 2,2-bis-(4-hydroxyphenyl)propane, which is also referred to as bisphenol A.

The polycarbonate resin may be a branched polycarbonate resin. For example, the polycarbonate resin may be a branched polycarbonate resin obtained by adding about 0.05 mol % to about 2 mol % of a tri- or higher polyfunctional compound, for example, a tri- or higher valent phenol group-containing compound, based on the total number of moles of the diphenols used in polymerization.

The polycarbonate resin may be a homopolycarbonate resin, a copolycarbonate resin, or a blend thereof. The polycarbonate resin may be partially or completely replaced by an aromatic polyester-carbonate resin obtained by polymerization in the presence of an ester precursor, for example, a bifunctional carboxylic acid.

The polycarbonate resin may have a weight average molecular weight (Mw) of about 10,000 g/mol to about 50,000 g/mol, for example, about 15,000 g/mol to about 40,000 g/mol, as measured by gel permeation chromatography (GPC). Within this range, the thermoplastic resin composition can have good fluidity (processability), and the like.

(B) Rubber Modified Aromatic Vinyl Copolymer Resin

The rubber modified aromatic vinyl copolymer resin may include (B1) a rubber modified aromatic vinyl graft copolymer and (B2) an aromatic vinyl copolymer resin.

(B1) Rubber Modified Aromatic Vinyl Graft Copolymer

The Rubber Modified Aromatic Vinyl Graft Copolymer May be Obtained by Graft polymerization of a monomer mixture comprising an aromatic vinyl monomer and a monomer copolymerizable with the aromatic vinyl monomer, for example a vinyl cyanide monomer and/or a $C_1$ to $C_{10}$ alkyl (meth)acrylate, to a rubber polymer. For example, the rubber modified vinyl graft copolymer may be obtained by graft polymerization of the monomer mixture comprising the aromatic vinyl monomer and the vinyl cyanide monomer to the rubber polymer, in which the monomer mixture may further optionally include a monomer for imparting processability and/or heat resistance, as needed.

As used herein, polymerization may be performed by any typical polymerization method, such as emulsion polymerization, suspension polymerization, and the like.

In addition, the rubber modified vinyl graft copolymer may form a core (rubber polymer)-shell (copolymer of the monomer mixture) structure, without being limited thereto.

Examples of the rubber polymer may include without limitation diene rubbers, such as polybutadiene, poly(styrene-butadiene), and/or poly(acrylonitrile-butadiene); saturated rubbers obtained by adding hydrogen to the diene rubbers; isoprene rubbers; $C_2$ to $C_{10}$ alkyl (meth)acrylate rubbers; copolymers of a $C_2$ to $C_{10}$ alkyl (meth)acrylate and styrene; and/or ethylene-propylene-diene monomer terpolymer (EPDM); and the like. These may be used alone or as a mixture thereof. For example, the rubber polymer may include diene rubbers and/or (meth)acrylate rubbers. For example, the rubber polymer may include butadiene rubber and/or butyl acrylate rubber.

The rubber polymer (rubber particle) may have an average particle diameter (Z-average) of about 0.05 μm to about 6 μm, for example, about 0.15 μm to about 4 m, and as another example about 0.25 m to about 3.5 m. Within this range, the thermoplastic resin composition can have good properties in terms of impact resistance, external appearance, and the like.

As used herein, the average particle diameter (z-average) of the rubber polymer (rubber particles) may be measured by a light scattering method in a latex state.

Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co. Ltd., nano-zs).

The rubber polymer may be present in an amount of about 30 wt % to about 80 wt %, for example, about 35 wt % to about 70 wt %, and the monomer mixture (including the aromatic vinyl monomer and a monomer copolymerizable with the aromatic vinyl monomer, for example a vinyl cyanide monomer and/or a $C_1$ to $C_{10}$ alkyl (meth)acrylate) may be present in an amount of about 20 wt % to about 70 wt %, for example, about 30 wt % to about 65 wt %. each based on 100 wt % of the rubber modified aromatic vinyl graft copolymer.

In some embodiments, the rubber modified aromatic vinyl graft copolymer can include the rubber polymer in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt % based on 100 wt % of the rubber modified aromatic vinyl graft copolymer. Further, according to some embodiments, the rubber polymer can be present in an amount of from about any of the foregoing amounts to about any other of the foregoing amounts.

In some embodiments, the rubber modified aromatic vinyl graft copolymer can include the monomer mixture in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt % based on 100 wt % of the rubber modified aromatic vinyl graft copolymer. Further, according to some embodiments, the monomer mixture can be present in an amount of from about any of the foregoing amounts to about any other of the foregoing amounts.

Within these ranges, the thermoplastic resin composition can have good properties in terms of impact resistance, external appearance, and the like.

The aromatic vinyl monomer may be graft copolymerizable with the rubber polymer. Examples of the aromatic vinyl monomer may include, for example, styrene, α-methylstyrene, β-methyl styrene, p-methylstyrene, p-t-butyl styrene, ethylstyrene, vinylxylene, monochlorostyrene, dichlorostyrene, dibromostyrene, and/or vinyl naphthalene, and the like, without being limited thereto. These may be used alone or as a mixture thereof.

The monomer mixture can include the aromatic vinyl monomer in an amount of about 10 wt % to about 90 wt %, for example, about 40 wt % to about 90 wt %, based on 100 wt % of the monomer mixture. In some embodiments, the monomer mixture can include the aromatic vinyl monomer in an amount of 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on 100 wt % of the monomer mixture. Further, according to some embodiments, the aromatic vinyl monomer can be present in an amount of from about any of the foregoing amounts to about any other of the foregoing amounts.

Within this range, the thermoplastic resin composition can have good properties in terms of processability, impact resistance, and the like.

Examples of the monomer copolymerizable with the aromatic vinyl monomer can include without limitation vinyl cyanide monomers and/or $C_1$ to $C_{10}$ alkyl (meth) acrylates.

Examples of the vinyl cyanide monomer may include, for example, acrylonitrile, methacrylonitrile, ethacrylonitrile, phenyl acrylonitrile, α-chloroacrylonitrile, and/or fumaronitrile, and the like. These may be used alone or as a mixture thereof. For example, the vinyl cyanide monomer may be acrylonitrile and/or methacrylonitrile.

Examples of the $C_1$ to $C_{10}$ alkyl (meth)acrylate may include without limitation methyl methacrylate and/or methyl acrylate, and the like, and mixtures and/or combinations thereof.

The monomer mixture can include the monomer copolymerizable with the aromatic vinyl monomer, such as the vinyl cyanide monomer and/or $C_1$ to $C_{10}$ alkyl (meth) acrylate, in an amount of about 10 wt % to about 90 wt %, for example, about 10 wt % to about 60 wt %, based on 100 wt % of the monomer mixture. In some embodiments, the monomer mixture can include the monomer copolymerizable with the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on 100 wt % of the monomer mixture. Further, according to some embodiments, the monomer copolymerizable with the aromatic vinyl monomer can be present in an amount of from about any of the foregoing amounts to about any other of the foregoing amounts.

Within this range, the thermoplastic resin composition can have good properties in terms of chemical resistance, mechanical properties, and the like.

The monomer mixture may further optionally include a monomer for imparting processability and/or heat resistance. Examples of the monomer for imparting processability and/or heat resistance may include (meth)acrylic acid, maleic anhydride, and/or N-substituted maleimide, and the like, and mixtures and/or combinations thereof, without being limited thereto.

The monomer mixture can include the monomer for imparting processability and/or heat resistance in an amount of about 15 wt % or less, for example, about 0.1 wt % to about 10 wt %, based on 100 wt % of the monomer mixture. In some embodiments, the monomer mixture can include the monomer for imparting processability and/or heat resistance in an amount of 0 (the monomer for imparting processability and/or heat resistance is not present), about 0 (the monomer for imparting processability and/or heat resistance is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt % based on 100 wt % of the monomer mixture. Further, according to some embodiments, the monomer for imparting processability and/or heat resistance can be present in an amount of from about any of the foregoing amounts to about any other of the foregoing amounts.

Within this range, the monomer for imparting processability and/or heat resistance can impart processability and/or heat resistance to the thermoplastic resin composition with minimal or no deterioration in other properties.

Examples of the rubber modified aromatic vinyl graft copolymer may include without limitation a g-ABS copolymer obtained by grafting a styrene monomer (as the aromatic vinyl compound) and an acrylonitrile monomer (as the vinyl cyanide compound) to a butadiene-based rubber polymer, a g-MBS copolymer obtained by grafting a styrene monomer (as the aromatic vinyl compound) and methyl methacrylate (as the monomer copolymerizable therewith) to a butadiene-based rubber polymer, an acrylonitrile-styrene-acrylate (g-ASA) copolymer obtained by grafting a styrene monomer (as the aromatic vinyl compound) and an acrylonitrile monomer (as the vinyl cyanide compound) to a butyl acrylate-based rubber polymer, and the like, and mixtures and/or combinations thereof.

The rubber modified aromatic vinyl copolymer resin can include the rubber modified aromatic vinyl graft copolymer in an amount of about 20 wt % to about 50 wt %, for example, about 25 wt % to about 45 wt %, based on 100 wt % of the rubber modified aromatic vinyl copolymer resin. In some embodiments, the rubber modified aromatic vinyl copolymer resin can include the rubber modified aromatic vinyl graft copolymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt % based on 100 wt % of the rubber modified aromatic vinyl copolymer resin. Further, according to some embodiments, the rubber modified aromatic vinyl graft copolymer can be present in an amount of from about any of the foregoing amounts to about any other of the foregoing amounts.

Within this range, the thermoplastic resin composition can exhibit good properties in terms of impact resistance, fluidity (molding processability), external appearance, and balance therebetween.

(B2) Aromatic Vinyl Copolymer Resin

The aromatic vinyl copolymer resin may be an aromatic vinyl copolymer resin used for a typical rubber modified aromatic vinyl graft copolymer resin and does not include a rubber polymer. For example, the aromatic vinyl copolymer resin may be a polymer of a monomer mixture comprising an aromatic vinyl monomer and a monomer copolymerizable with the aromatic vinyl monomer.

The aromatic vinyl copolymer resin may be obtained by mixing the aromatic vinyl monomer and the monomer copolymerizable with the aromatic vinyl monomer, followed by polymerization. As used herein, polymerization may be carried out by any well-known polymerization method, such as emulsion polymerization, suspension polymerization, bulk polymerization, and the like.

Examples of the aromatic vinyl monomer may include without limitation styrene, α-methyl styrene, β-methyl styrene, p-methyl styrene, p-t-butyl styrene, ethylstyrene, vinylxylene, monochlorostyrene, dichlorostyrene, dibromostyrene, and/or vinyl naphthalene, and the like. These may be used alone or as a mixture thereof.

The aromatic vinyl copolymer resin can include the aromatic vinyl monomer in an amount of about 20 wt % to about 90 wt %, for example, about 30 wt % to about 80 wt %, based on 100 wt % of the aromatic vinyl copolymer resin. In some embodiments, the aromatic vinyl copolymer resin can include the aromatic vinyl monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on 100 wt % of the aromatic vinyl copolymer resin. Further, according to some embodiments, the aromatic vinyl monomer can be present in an amount of from about any of the foregoing amounts to about any other of the foregoing amounts.

Within this range, the thermoplastic resin composition can exhibit good properties in terms of impact resistance, fluidity, and the like.

Examples of the monomer copolymerizable with the aromatic vinyl monomer may include without limitation vinyl cyanide monomers and/or (meth)acrylic monomers. For example, the monomer copolymerizable with the aromatic vinyl monomer may include a vinyl cyanide monomer, or a vinyl cyanide monomer and a (meth)acrylic monomer.

Examples of the vinyl cyanide monomer may include acrylonitrile, methacrylonitrile, ethacrylonitrile, phenylacrylonitrile, α-chloroacrylonitrile, and/or fumaronitrile, without being limited thereto. These may be used alone or as a mixture thereof. For example, acrylonitrile and/or methacrylonitrile, and the like may be used.

Examples of the (meth)acrylic monomer may include without limitation (meth)acrylic acids and/or $C_1$ to $C_{10}$ alkyl (meth)acrylates. These may be used alone or as a mixture thereof. For example, methyl methacrylate and/or methyl acrylate, and the like, and mixtures and/or combinations thereof may be used.

In some embodiments, when the monomer copolymerizable with the aromatic vinyl monomer is composed of a mixture of the vinyl cyanide monomer and the (meth)acrylic monomer, the vinyl cyanide monomer may be present in an amount of about 1 wt % to about 40 wt %, for example, about 2 wt % to about 35 wt %, and the (meth)acrylic monomer may be present in an amount of about 60 wt % to about 99 wt %, for example, about 65 wt % to about 98 wt %, based on 100 wt % of the monomer copolymerizable with the aromatic vinyl monomer.

In some embodiments, the monomer copolymerizable with the aromatic vinyl monomer composed of a mixture of the vinyl cyanide monomer and the (meth)acrylic monomer can include the vinyl cyanide monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt % based on 100 wt % of the monomer copolymerizable with the aromatic vinyl monomer composed of a mixture of the vinyl cyanide monomer and the (meth)acrylic monomer. Further, according to some embodiments, the vinyl cyanide monomer can be present in an amount of from about any of the foregoing amounts to about any other of the foregoing amounts.

In some embodiments, the monomer copolymerizable with the aromatic vinyl monomer composed of a mixture of the vinyl cyanide monomer and the (meth)acrylic monomer can include the (meth)acrylic monomer in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt % based on 100 wt % of the monomer copolymerizable with the aromatic vinyl monomer composed of a mixture of the vinyl cyanide monomer and the (meth)acrylic monomer. Further, according to some embodiments, the (meth)acrylic monomer can be present in an amount of from about any of the foregoing amounts to about any other of the foregoing amounts.

Within these ranges, the thermoplastic resin composition can exhibit good properties in terms of transparency, heat resistance, processability, and the like.

The aromatic vinyl copolymer resin can include the monomer copolymerizable with the aromatic vinyl monomer in an amount of about 10 wt % to about 80 wt %, for example, about 20 wt % to about 70 wt %, based on 100 wt % of the aromatic vinyl copolymer resin. In some embodiments, the aromatic vinyl copolymer resin can include the monomer copolymerizable with the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt % based on 100 wt % of the aromatic vinyl copolymer resin. Further, according to some embodiments, the monomer copolymerizable with the aromatic vinyl monomer can be present in an amount of from about any of the foregoing amounts to about any other of the foregoing amounts.

Within this range, the thermoplastic resin composition can exhibit good properties in terms of impact resistance, fluidity, and the like.

The aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin exhibits good properties in terms of mechanical strength, formability, and the like.

The rubber modified aromatic vinyl copolymer resin can include the aromatic vinyl copolymer resin in an amount of about 50 wt % to about 80 wt %, for example, about 55 wt % to about 75 wt %, based on 100 wt % of the rubber modified aromatic vinyl copolymer resin. In some embodiments, the rubber modified aromatic vinyl copolymer resin can include the aromatic vinyl copolymer resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt % based on 100 wt % of the rubber modified aromatic vinyl copolymer resin. Further, according to some embodiments, the aromatic vinyl copolymer resin can be present in an amount of from about any of the foregoing amounts to about any other of the foregoing amounts.

Within this range, the thermoplastic resin composition can exhibit good properties in terms of impact resistance, fluidity (molding processability), and the like.

The thermoplastic resin composition can include the rubber modified aromatic vinyl copolymer resin in an amount of about 1 to about 20 parts by weight, for example, about 5 to about 15 parts by weight, relative to about 100 parts by weight of the polycarbonate resin. In some embodiments, the thermoplastic resin composition can include the rubber modified aromatic vinyl copolymer resin in an amount of about 1, 2, 3, 4, 5, 6, 7, 8, 9, 10, 11, 12, 13, 14, 15, 16, 17, 18, 19, or 20 parts by weight, based on about 100 parts by weight of the polycarbonate resin. Further, according to some embodiments, the rubber modified aromatic vinyl copolymer resin can be present in an amount of from about any of the foregoing amounts to about any other of the foregoing amounts.

If the content of the rubber modified aromatic vinyl copolymer resin is less than about 1 part by weight relative to about 100 parts by weight of the polycarbonate resin, the thermoplastic resin composition can suffer from deterioration in impact resistance and fluidity, and if the content of the rubber modified aromatic vinyl copolymer resin exceeds about 20 parts by weight, the thermoplastic resin composition can suffer from deterioration in processability, external appearance, and heat resistance.

(C) Maleic Anhydride Modified Olefin Copolymer

The maleic anhydride modified olefin copolymer is a reactive type olefin copolymer obtained by graft copolymerization of maleic anhydride, which is a reactive functional group, to an olefin copolymer, and can improve impact resistance and chemical resistance of the thermoplastic resin composition together with a particular phosphite compound.

The maleic anhydride modified olefin copolymer may be obtained by graft copolymerization of maleic anhydride to an olefin copolymer obtained by copolymerization two or more alkylene monomers. The alkylene monomer may be a C2 to C10 alkylene. Examples of the alkylene monomer include without limitation ethylene, propylene, isopropylene, butylene, isobutylene, and/or octene, and the like, and mixtures and/or combinations thereof.

The maleic anhydride modified olefin copolymer may include a maleic anhydride modified alkylene-α-olefin copolymer obtained by graft copolymerization of maleic anhydride to an alkylene-α-olefin copolymer.

Examples of the maleic anhydride modified olefin copolymer may include without limitation a maleic anhydride modified ethylene-butene copolymer, and/or a maleic anhydride modified ethylene-octene copolymer, and the like, and mixtures and/or combinations thereof.

The maleic anhydride modified olefin copolymer may have a melt-flow index of about 0.5 to about 20 g/10 min, for example, about 1 to about 10 g/10 min, as measured under conditions of 190° C. and 2.16 kg in accordance with ASTM D1238.

The thermoplastic resin composition can include the maleic anhydride modified olefin copolymer in an amount of about 0.1 to about 2 parts by weight, for example, about 0.3 to about 1.5 parts by weight, relative to about 100 parts by weight of the polycarbonate resin. In some embodiments, the thermoplastic resin composition can include the maleic anhydride modified olefin copolymer in an amount of about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 parts by weight, based on about 100 parts by weight of the polycarbonate resin. Further, according to some embodiments, the maleic anhydride modified olefin copolymer can be present in an amount of from about any of the foregoing amounts to about any other of the foregoing amounts.

If the content of the maleic anhydride modified olefin copolymer is less than about 0.1 parts by weight relative to about 100 parts by weight of the polycarbonate resin, the thermoplastic resin composition can suffer from deterioration in chemical resistance, impact resistance, thermal stability, and the like, and if the content of the maleic anhydride modified olefin copolymer exceeds about 2 parts by weight, the thermoplastic resin composition can suffer from deterioration in chemical resistance, impact resistance, thermal stability, and the like.

(D) Phosphite Compound

The phosphite compound is applied together with the maleic anhydride modified olefin copolymer in preparation of the thermoplastic resin composition to improve chemical resistance, impact resistance, and balance therebetween of the thermoplastic resin composition, and may be a phosphite compound represented by Formula 1:

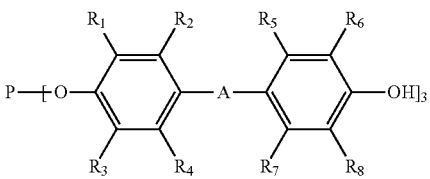

[Formula 1]

wherein $R_1$, $R_2$, $R_3$, $R_4$, $R_5$, $R_6$, $R_7$ and $R_8$ are each independently a hydrogen atom or a $C_1$ to $C_{10}$ alkyl group, and A is a sulfur atom or an oxygen atom.

In some embodiments, one or more of $R_1$, $R_2$, $R_3$ and $R_4$ may include a $C_4$ to $C_{10}$ branched alkyl group, and one or more of $R_5$, $R_6$, $R_7$ and $R_8$ may include a $C_4$ to $C_{10}$ branched alkyl group.

The phosphite compound may include a compound represented by Formula 1a:

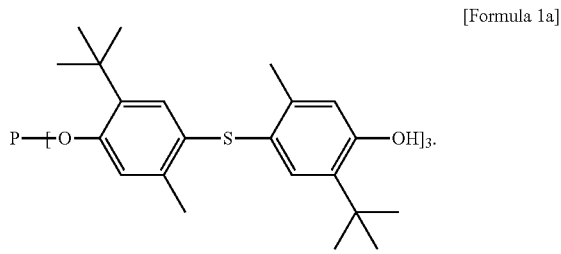

[Formula 1a]

The thermoplastic resin composition can include the phosphite compound in an amount of about 0.1 to about 2 parts by weight, for example, about 0.2 to about 1.5 parts by weight, relative to about 100 parts by weight of the polycarbonate resin. In some embodiments, the thermoplastic resin composition can include the phosphite compound in an amount of about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 parts by weight, based on about 100 parts by weight of the polycarbonate resin. Further, according to some embodiments, the phosphite compound can be present in an amount of from about any of the foregoing amounts to about any other of the foregoing amounts.

If the content of the phosphite compound is less than about 0.1 parts by weight relative to about 100 parts by weight of the polycarbonate resin, the thermoplastic resin composition can suffer from deterioration in chemical resistance, impact resistance, thermal stability, and the like, and if the content of the phosphite compound exceeds about 2 parts by weight, the thermoplastic resin composition can suffer from deterioration in chemical resistance, impact resistance, heat resistance, and the like.

The maleic anhydride modified olefin copolymer (C) and the phosphite compound (D) may be present in a weight ratio (C:D) of about 1:0.1 to about 1:3, for example, about 1:0.2 to about 1:2. In some embodiments, the maleic anhydride modified olefin copolymer (C) and the phosphite compound (D) may be present in a weight ratio (C:D) of about 1:0.1, 1:0.2, 1:0.3, 1:0.4, 1:0.5, 1:0.6, 1:0.7, 1:0.8, 1:0.9, 1:1, 1:2, or 1:3. Within this range, the thermoplastic resin composition can have further improved properties in terms of chemical resistance, impact resistance, and balance therebetween.

The thermoplastic resin composition may further optionally include one or more additives used in typical thermoplastic resin compositions. Examples of the additives may include a flame retardant, an anti-dripping agent, inorganic fillers, a lubricant, a nucleating agent, a stabilizer, a release agent, pigments, dyes, and the like, and mixtures thereof, without being limited thereto. The additives may be present in an amount of about 0.001 to about 40 parts by weight, for example, about 0.1 to about 10 parts by weight, relative to about 100 parts by weight of the thermoplastic resin.

The thermoplastic resin composition may be prepared in pellet form by mixing the aforementioned components, followed by melt extrusion using a typical twin-screw extruder at about 200° C. to about 280° C., for example, about 220° C. to about 260° C.

The thermoplastic resin composition may have a fracture height of about 55 cm to 110 cm, for example, about 60 to about 100 cm, as measured on a 2 mm thick specimen using a drop impact tester in accordance with the DuPont drop test by dipping the specimen in a thinner solution for 2.5 minutes, drying the specimen at 80° C. for 20 minutes, allowing the specimen to be left at room temperature for 24 hours, and measuring a height, at which dropping a 4 kg dart results in breakage of the specimen.

The thermoplastic resin composition may have a notched Izod impact strength of about 70 kgf·cm/cm to about 100 kgf·cm/cm, for example, about 75 kgf·cm/cm to about 90 kgf·cm/cm, as measured on a ⅛" thick specimen in accordance with ASTM D256.

The present disclosure also relates to a molded article according formed of the thermoplastic resin composition set forth above. The thermoplastic resin composition may be prepared in pellet form and the prepared pellets may be produced into various molded articles (products) by various molding methods, such as injection molding, extrusion molding, vacuum molding, and casting. Such molding methods are well known to those skilled in the art.

The molded article may be useful as interior and/or exterior materials for automobile parts and electric and/or electronic products, and an exterior material for buildings due to good properties in terms of chemical resistance, impact resistance, and balance therebetween. For example, the molded article may be used as an interior and/or exterior material for mobile phones, notebook computers, and the like, which require a painting process such as clear-coating.

Next, the present invention will be described in more detail with reference to the following examples. It should be understood that these examples are provided for illustration only and are not to be in any way construed as limiting the present invention.

EXAMPLES

Details of each component used in Examples and Comparative Examples are as follows:
(A) Polycarbonate Resin
A bisphenol-A polycarbonate resin (weight average molecular weight: 25,000 g/mol) is used.
(B) Rubber Modified Aromatic Vinyl Copolymer Resin
A mixture of 25 wt % of (B1) a rubber modified aromatic vinyl graft copolymer and 75 wt % of (B2) an aromatic vinyl copolymer resin is used.
(B1) Rubber Modified Aromatic Vinyl Graft Copolymer
A core-shell type graft copolymer (g-ABS) obtained by graft copolymerization of 42 wt % of a monomer mixture of styrene and acrylonitrile (styrene/acrylonitrile: 31.5 wt %/10.5 wt %) to 58 wt % of butadiene rubber particles having an average particle diameter of 1 μm is used.
(B2) Aromatic Vinyl Copolymer Resin
A resin (weight average molecular weight: 200,000 g/mol) obtained by polymerization of 72.5 wt % of styrene and 27.5 wt % of acrylonitrile is used.
(C) Modified Olefin Copolymer
(C1) A maleic anhydride modified ethylene-butene copolymer (Manufacturer: Mitsui Chemicals, Product Name: TAFMER MH-7020) is used.
(C2) A glycidyl methacrylate modified ethylene-butyl acrylate copolymer (Manufacturer: DuPont, Product Name: Elvaroy PTW) is used.
(D) Phosphite Compound
(D1) Phosphite compound represented by Formula 1a is used.

[Formula 1a]

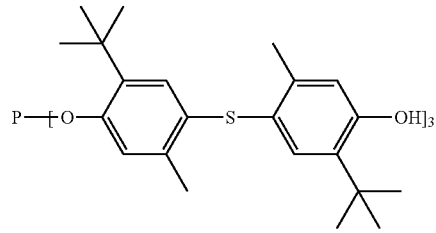

(D2) A triphenyl phosphite compound is used.
(D3) A tri(2,4-di-tert-butylphenyl)phosphite compound is used.
(D4) A tri(4-methoxyphenyl)phosphite compound is used.

Examples 1 to 5 and Comparative Examples 1 to 8

The aforementioned components are mixed in amounts as listed in Tables 1 and 2, followed by extrusion at 250° C., thereby preparing a thermoplastic resin composition in pellet form. Here, extrusion is performed using a twin-screw extruder (L/D: 36, Q: 45 mm). The prepared pellets are dried at 100° C. for 4 hours or more and then subjected to injection molding using a 10 oz. injection machine (molding temperature: 300° C.), thereby preparing a specimen. The prepared specimen is evaluated as to the following properties. Results are shown in Tables 1 and 2.

Property Evaluation
(1) Chemical resistance (post-painting impact resistance): A 2 mm thick specimen is dipped in a thinner solution (components: methyl isobutyl ketone 45 wt %, diisobutyl ketone 5 wt %, toluene 5 wt %, 2-butoxyethanol 25 wt %, n-butyl acetate 10 wt % and methyl ethyl ketone 10 wt %)

for 2.5 minutes, dried at 80° C. for 20 minutes, and left at room temperature for 24 hours, followed by measurement of a height (unit: cm), at which dropping a 4 kg dart resulted in breakage of the specimen, using a drop impact tester in accordance with the DuPont drop test.

(2) Notched Izod impact strength (unit: kgf·cm/cm): Notched Izod impact strength is measured on a ⅛" thick Izod specimen in accordance with ASTM D256.

TABLE 1

|  | Example | | | | |
| --- | --- | --- | --- | --- | --- |
|  | 1 | 2 | 3 | 4 | 5 |
| (A) (parts by weight) | 100 | 100 | 100 | 100 | 100 |
| (B) (parts by weight) | 5 | 5 | 5 | 5 | 5 |
| (C1) (parts by weight) | 0.5 | 0.3 | 1.0 | 0.5 | 0.5 |
| (C2) (parts by weight) | — | — | — | — | — |
| (D1) (parts by weight) | 0.5 | 0.5 | 0.5 | 0.2 | 1.0 |
| (D2) (parts by weight) | — | — | — | — | — |
| (D3) (parts by weight) | — | — | — | — | — |
| (D4) (parts by weight) | — | — | — | — | — |
| Fracture height (cm) | 72 | 65 | 78 | 70 | 96 |
| Notched Izod impact strength (kgf · cm/cm) | 78 | 75 | 80 | 77 | 78 |

TABLE 2

|  | Comparative Example | | | | | | | |
| --- | --- | --- | --- | --- | --- | --- | --- | --- |
|  | 1 | 2 | 3 | 4 | 5 | 6 | 7 | 8 |
| (A) (parts by weight) | 100 | 100 | 100 | 100 | 100 | 100 | 100 | 100 |
| (B) (parts by weight) | 5 | 5 | 5 | 5 | 5 | 5 | 5 | 5 |
| (C1) (parts by weight) | 0.05 | 2.5 | — | 0.5 | 0.5 | 0.5 | 0.5 | 0.5 |
| (C2) (parts by weight) | — | — | 0.5 | — | — | — | — | — |
| (D1) (parts by weight) | 0.5 | 0.5 | 0.5 | 0.05 | 2.5 | — | — | — |
| (D2) (parts by weight) | — | — | — | — | — | 0.5 | — | — |
| (D3) (parts by weight) | — | — | — | — | — | — | 0.5 | — |
| (D4) (parts by weight) | — | — | — | — | — | — | — | 0.5 |
| Fracture height (cm) | 50 | 46 | 48 | 53 | 48 | 38 | 35 | 36 |
| Notched Izod impact strength (kgf · cm/cm) | 73 | 69 | 72 | 75 | 70 | 66 | 67 | 65 |

From the results shown in Table 1, it can be seen that the thermoplastic resin composition according to the present disclosure has good properties in terms of chemical resistance (post-painting impact resistance), impact resistance, and balance therebetween.

Conversely, it can be seen that the composition of Comparative Example 1 prepared using a smaller amount of the maleic anhydride modified olefin copolymer suffers from deterioration in chemical resistance and the like; the composition of Comparative Example 2 prepared using an excess of the rubber modified maleic anhydride modified olefin copolymer suffers from deterioration in impact resistance, chemical resistance, and the like; and the composition of Comparative Example 3 prepared using the glycidyl methacrylate modified ethylene-butyl acrylate copolymer (C2) instead of the maleic anhydride modified olefin copolymer suffers from deterioration in chemical resistance and the like. It can be seen that the composition of Comparative Example 4 prepared using a small amount of the phosphite compound suffers from deterioration in chemical resistance and the like; the composition of Comparative Example 5 prepared using an excess of the phosphite compound suffers from deterioration in chemical resistance and the like; and the composition of Comparative Examples 6, 7 or 8 prepared using the phosphite compound (D2), (D3) or (D4) instead of the phosphite compound according to the present disclosure suffers from deterioration in chemical resistance, impact resistance, and the like.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition comprising:
   about 100 parts by weight of a polycarbonate resin;
   about 1 to about 20 parts by weight of a rubber modified aromatic vinyl copolymer resin;
   about 0.1 to about 2 parts by weight of a maleic anhydride modified olefin copolymer; and
   about 0.1 to about 2 parts by weight of a phosphite compound represented by the following Formula 1,

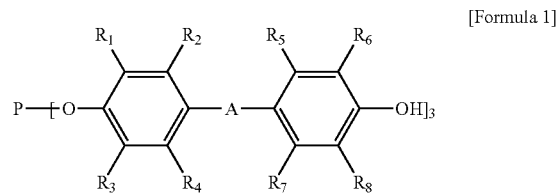

[Formula 1]

wherein $R_1$, $R_2$, $R_3$, $R_4$, $R_5$, $R_6$, $R_7$ and $R_8$ are each independently a hydrogen atom or a $C_1$ to $C_{10}$ alkyl group, and A is a sulfur atom or an oxygen atom.

2. The thermoplastic resin composition according to claim 1, wherein the rubber modified aromatic vinyl copolymer resin comprises a rubber modified aromatic vinyl graft copolymer and an aromatic vinyl copolymer resin.

3. The thermoplastic resin composition according to claim 2, wherein the rubber modified aromatic vinyl graft copolymer is obtained by graft copolymerization of a monomer mixture comprising an aromatic vinyl monomer and a vinyl cyanide monomer to a rubber polymer.

4. The thermoplastic resin composition according to claim 1, wherein the maleic anhydride modified olefin copolymer comprises a maleic anhydride modified alkylene-α-olefin copolymer obtained by graft copolymerization of maleic anhydride to an alkylene-α-olefin copolymer.

5. The thermoplastic resin composition according to claim 1, wherein the maleic anhydride modified olefin copolymer comprises a maleic anhydride modified ethylene-butene copolymer and/or a maleic anhydride modified ethylene-octene copolymer.

6. The thermoplastic resin composition according to claim 1, wherein one or more of $R_1$, $R_2$, $R_3$ and $R_4$ comprises a $C_4$ to $C_{10}$ branched alkyl group and one or more of $R_5$, $R_6$, $R_7$ and $R_8$ comprises a $C_4$ to $C_{10}$ branched alkyl group.

7. The thermoplastic resin composition according to claim 1, wherein the phosphite compound comprises a compound represented by the following Formula 1a:

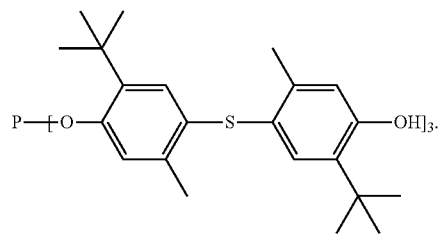

[Formula 1a]

8. The thermoplastic resin composition according to claim 1, wherein the maleic anhydride modified olefin copolymer and the phosphite compound are present in a weight ratio of about 1:0.1 to about 1:3.

9. The thermoplastic resin composition according to claim 1, wherein the thermoplastic resin composition has a fracture height of about 55 cm to 100 cm, as measured on a 2 mm thick specimen using a drop impact tester in accordance with the DuPont drop test by dipping the specimen in a thinner solution for 2.5 minutes, drying the specimen at 80° C. for 20 minutes, allowing the specimen to be left at room temperature for 24 hours, and measuring a height, at which dropping a 4 kg dart results in breakage of the specimen.

10. The thermoplastic resin composition according to claim 1, wherein the thermoplastic resin composition has a notched Izod impact strength of about 70 kgf·cm/cm to about 100 kgf·cm/cm, as measured on a ⅛" thick specimen in accordance with ASTM D256.

11. A molded article formed of the thermoplastic resin composition according to claim 1.

* * * * *